United States Patent
Ramanathan et al.

(10) Patent No.: US 7,174,382 B2
(45) Date of Patent: Feb. 6, 2007

(54) INTEREST-BASED CONNECTIONS IN PEER-TO-PEER NETWORKS

(75) Inventors: Murali Krishna Ramanathan, West Lafayette, IN (US); Vasiliki Kalogeraki, Sunnyvale, CA (US); James Christopher Pruyne, Naperville, IL (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 697 days.

(21) Appl. No.: 10/119,449

(22) Filed: Apr. 9, 2002

(65) Prior Publication Data

US 2003/0191828 A1 Oct. 9, 2003

(51) Int. Cl.
G06F 15/16 (2006.01)

(52) U.S. Cl. .................. 709/227; 709/217; 709/207

(58) Field of Classification Search ........ 709/220–222, 709/201, 217–219, 227–229, 238, 241, 244, 709/204–206; 713/100
See application file for complete search history.

(56) References Cited

U.S. PATENT DOCUMENTS

| | | | | |
|---|---|---|---|---|
| 5,557,786 | A * | 9/1996 | Johnson, Jr. | 707/101 |
| 5,701,467 | A * | 12/1997 | Freeston | 707/100 |
| 5,974,236 | A * | 10/1999 | Sherman | 709/221 |
| 6,055,568 | A * | 4/2000 | Adams | 709/221 |
| 6,502,175 | B1 * | 12/2002 | Krishnan et al. | 711/170 |
| 6,742,023 | B1 * | 5/2004 | Fanning et al. | 709/219 |
| 6,791,949 | B1 * | 9/2004 | Ryu et al. | 370/254 |
| 6,836,463 | B2 * | 12/2004 | Garcia-Luna-Aceves et al. | 370/238 |
| 6,857,012 | B2 * | 2/2005 | Sim et al. | 709/222 |
| 6,961,310 | B2 * | 11/2005 | Cain | 370/238 |
| 7,027,773 | B1 * | 4/2006 | McMillin | 455/41.2 |
| 2002/0059025 | A1 * | 5/2002 | Kim et al. | 701/209 |
| 2002/0073204 | A1 * | 6/2002 | Dutta et al. | 709/227 |
| 2002/0184311 | A1 * | 12/2002 | Traversat et al. | 709/204 |
| 2003/0051051 | A1 * | 3/2003 | O'Neal et al. | 709/242 |
| 2003/0079003 | A1 * | 4/2003 | Burr | 709/221 |

(Continued)

OTHER PUBLICATIONS

MacGregor et al., Connectability: A Performance Metric for Reconfigurable Transport Networks, Dec. 1993, IEEE, whole document.*

(Continued)

*Primary Examiner*—David Wiley
*Assistant Examiner*—Joseph E. Avellino

(57) ABSTRACT

Peers (p) monitor responses received from other peers (s, q) to requests for information and rate the responding peers on their ability to provide information of interest. When a responding peer (s) is discovered to frequently provide good results, the requesting peer (p) attempts to move closer to the responding peer (s) by creating a direct connection (p-s) with that peer and thereby promote the "good" peer to an "immediate" peer. If such a promotion would result in too many direct connections, the least important immediate peer is demoted to an "indirect" peer. The criteria (Imp) used for evaluating the relative importance of at least the immediate peers is preferably a time weighted average $(Imp^*(t)=\alpha \cdot Imp(t)+\beta \cdot Imp^*(t-1))$ that also measures consistency and reliability and preferably includes factors not only representative of the peer's ability to provide requested information (Hits), but also of its proximity to the source of that information (1/Hops) so that it can prove that information efficiently. This leads to clusters of peers with similar interests, and in turn reduces the depth of searches typically required to achieve good results.

19 Claims, 7 Drawing Sheets

U.S. PATENT DOCUMENTS

2003/0120662 A1 * 6/2003 Vishik ........................ 707/100

OTHER PUBLICATIONS

M. Ramanathan et al., "Finding good peers in peer-to-peer networks" (Unpublished).

M. Ramanathan et al.; IEEE; "Finding Good Peers in Peer-to-Peer Networks" (Published Apr. 15, 2002).

INRIA "Is the Internet Fractal? The Multicast Power Law Revisited"; C. Adjih et al., No. 4157.

The gnutella homepage. In http://www.gnutella.wego.com.

The limewire homepage. In http://www.limewire.com.

The morpheus homepage. In http://www.musiccity.com.

B. Yang and H. Garcia-Molina. Comparing hybrid peer-to-peer systems. *In.Proceedings of Very Large Databases*, Rome, Italy, Sep. 2001.

L.A. Adamic, et al., Search in power-law networks. In http://www.parc.xerox.com/istl/groups/iea/papers/plsearch/.

C. Adjih et al. Multicase tree structure and the power law. In http://www.cs.purdue.edu/homes/spa/papers/multicast.ps. (Unpublished).

C. Adjih et al. Multicase tree structure and the power law. In http://www.cs.purdue.edu/homes/spa/papers/multicast.ps. (Published Jan. 6, 2002).

The akamai homepage. In http://www.akamai.com.

* cited by examiner

INTEREST-BASED CONNECTIONS IN PEER-TO-PEER NETWORKS

TECHNICAL FIELD

The present invention relates generally to networks having distributed storage, and more particularly to direct exchange of information between peers in a network.

BACKGROUND

Decentralized sharing of information and data through direct exchange may be used to distribute storage capacity and load across a network of peers. In fully decentralized peer-to-peer networks there is no need for a central coordinator; rather, communication may be handled individually by each peer.

In a peer-to-peer network, a node becomes a member of the network by establishing (possibly on a purely ad-hoc basis, or possibly in response to a message from a remote coordinator) a connection with at least one peer currently in the network. Each node typically maintains a small number of connections with its peers and messages are sent from one peer to another with each peer responding to queries for information that it may have stored locally. For example, to search for a file, a node broadcasts a search request to its directly connected peers, those directly connected peers propagate the requests to their own peers, and so on. Each such hop from one peer to the next contributes to an increase in the bandwidth on the communication links and furthermore to the time required to get results for the queries. The network bandwidth utilized for a search request is proportional to the number of messages, which in turn is dependent upon the number of peers that must process the request before the requested data has been located.

In a typical peer-to-peer file-searching network, each peer node has known bandwidth constraints and an arbitrary list of potential peer connections (either all registered members of the network, or an arbitrary subset), and peers are connected and disconnected from each other based on arbitrary criteria. The node has an arbitrary list of peers in the network and sends Ping messages to those peers to determine which are alive. A connection is established only if the other peer is active and responds with a Pong message. Therefore, a Gnutella node typically establishes connections with the first peers it finds available. To search for a particular file or document, the node sends a search request to its connected peers and those peers in turn forward the request to their own peers and so on. Each peer in the sending path keeps track of each request it forwards and returns any received results to the upstream requestor. Therefore, the number of peers that process the request grows exponentially as the request is propagated to ever more distant peers, with the maximum number of permitted hops (the message "Horizon") being set by the originating node and is typically about seven times. The number of connections maintained by a given peer in the known peer-to-peer Gnutella networks is based on the network bandwidth available to the peer and the actual bandwidth utilized for propagating queries to other peers; a peer may arbitrarily drop one or more of its existing connections if the bandwidth utilization by query messages gets too high.

OVERVIEW

Direct connections between peers are established and maintained in accordance with the "interests" of the peers. Two peers are deemed to have similar interests if they are potentially able to satisfy a substantial number of each other's requests. Those interests may be derived, for example, from the number and types of requested files maintained and/or provided by the other peer. Nodes learn about the interests of their peers by monitoring the replies they receive to their requests and storing (preferably in a local database) information about the replies from each peer. This stored information is then available for use in deciding when to add or drop a direct connection to a given peer. By appropriate manipulation of the connections between the peers, nodes with a high degree of similar interests will move closer (i.e., fewer hops) to one another in the network and, as distance between the peers grows, the similarity of the peers' interests will tend to decrease. Preferably, only a relatively small number of direct connections are maintained between peers, and the importance of each connection is preferably monitored at regular intervals based on factors such as the connection's value, efficiency, and reliability.

The below-described examples assume a Gnutella-like peer-to-peer distributed network, but many of the underlying concepts may also be applicable to other distributed computing networks. In particular, in such other networks, certain aspects of the processing, storing and routing of information by the individual nodes may be subject to centralized control and/or predetermined hierarchical assignments, the logical connections between nodes may or may not be based in part on the characteristics of the underlying physical connections; the logical connections between peers may not necessarily be symmetric in both directions; a reply may not necessarily be routed along the same physical or logical path as was used by its corresponding query; the message headers may contain additional and/or modified information about the source, destination and routing of the original query and of a particular response to that query; a given node may receive and process only one reply to a given request; and, the scoring formulae used for monitoring the various peers may use additional and/or modified factors which take into account specific characteristics of a particular logical and/or physical network.

FIGURES

EXAMPLES

Figure 1:
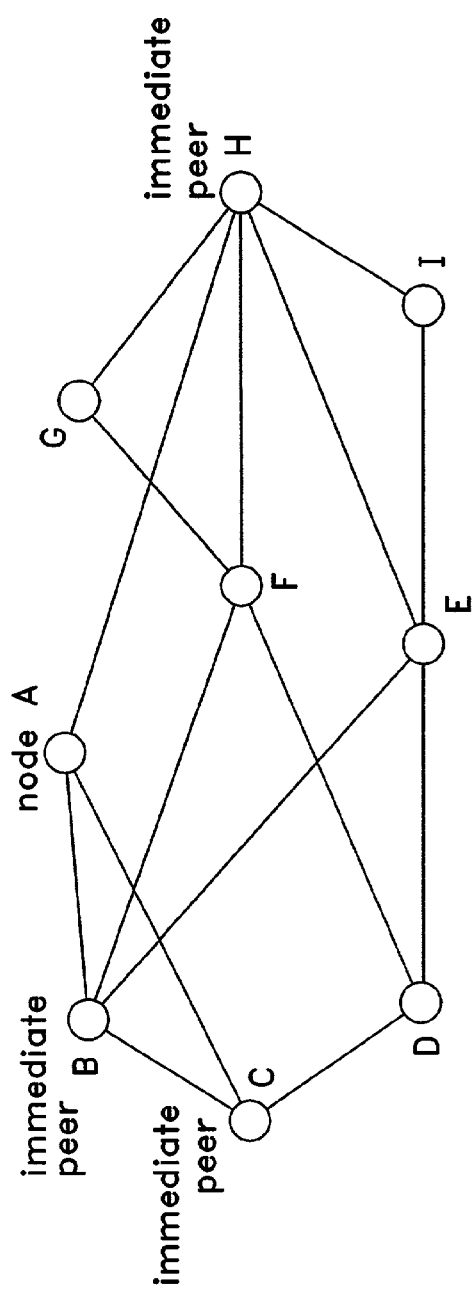
FIG. 1 depicts certain logical connections in an exemplary peer-to-peer network.

A distributed decentralized online database (e.g., an encyclopedia) may be organized as a logical network of peers, each maintaining a set of files (articles). There is no centralized directory that holds (or points to) all the files, the files are each dynamically maintained at the users' machines. The files can be updated very frequently as in the case of news bulletins or can be more static as in the case of historical information. Also, the files are preferably not necessarily unique; duplicate copies of static files (i.e., popular articles) may be locally stored or temporarily cached by many users and even dynamically changing files may be cached and synchronized in known manner at many different locations. In order to facilitate dynamic reconfiguration of the peer-to-peer network under local control using locally available information, this decentralized logical network preferably operates under one or more of the following assumptions:

Each active peer has a sufficiently large number of active connections to its peers that the network remains highly connected.

Multiple paths normally exist between any two active peers.

The same file is available from several active peers.

These assumptions each contribute to ensuring a low probability that any one peer will be a critical network component without which no copy of a requested file can be located and forwarded to the requesting peer. Note that "connected", unless otherwise clear from context, refers to a logical connection between peers used for peer-to-peer communication, while "active" refers to a functioning node that is connected to the underlying physical network. "Peer" refers to members of the peer-to-peer network, while "node" refers to a member of the physical network that supports the peer-to-peer network. Each peer will have an associated node address in the physical network, but each addressable node in the physical network will not necessarily be a member of the peer-to-peer network.

Network Architecture and Metrics

Peer-to-peer file searching networks such as Gnutella provide a logical network of nodes (peers) in which each peer maintains a direct logical connection with a group of other peers. The number of direct connections in such a network is typically limited by the available networking resources at the peer. Two nodes are called Immediate Peers if there is a direct connection between the nodes. Two nodes that are not Immediate Peers are called Indirect Peers if there exists an indirect communication path between these nodes via one or more Intermediate Peers (e.g., via an Immediate Peer of an Immediate Peer). It is also possible that certain peer node pairs may not be connected at all (not even indirectly) in the peer-to-peer network, even though they are both active nodes in an underlying physical network. In Gnutella-based networks, connections are symmetric in the sense that the peer at either end of the connection can initiate the sending of a message and/or choose to break the connection at any time. Since each peer is also a node of a physical network and can be addressed by its network address, it is also possible for any peer to communicate directly with any other peer using any common network address and communication protocol. In particular, the network node associated with each peer in the peer-to-peer network may support the IP communication protocol, and may have one or more associated IP addresses. Thus, once a Indirect Peer having the requested file has been has been located using the Peer-to-Peer network, the actual file contents can be routed to the requesting Peer using only the underlying IP network.

FIG. 1 shows an example of a peer-to-peer network NET. Although this exemplary network has only 9 peers, it will be realized that in a practical embodiment, many hundreds, or even many thousands of peers may be active members of the network at any particular instant of time. Node A has three Immediate Peers, nodes B, C, and H. The remaining five nodes (D, E, F, G, and I) are Indirect Peers to node A.

Figure 2:
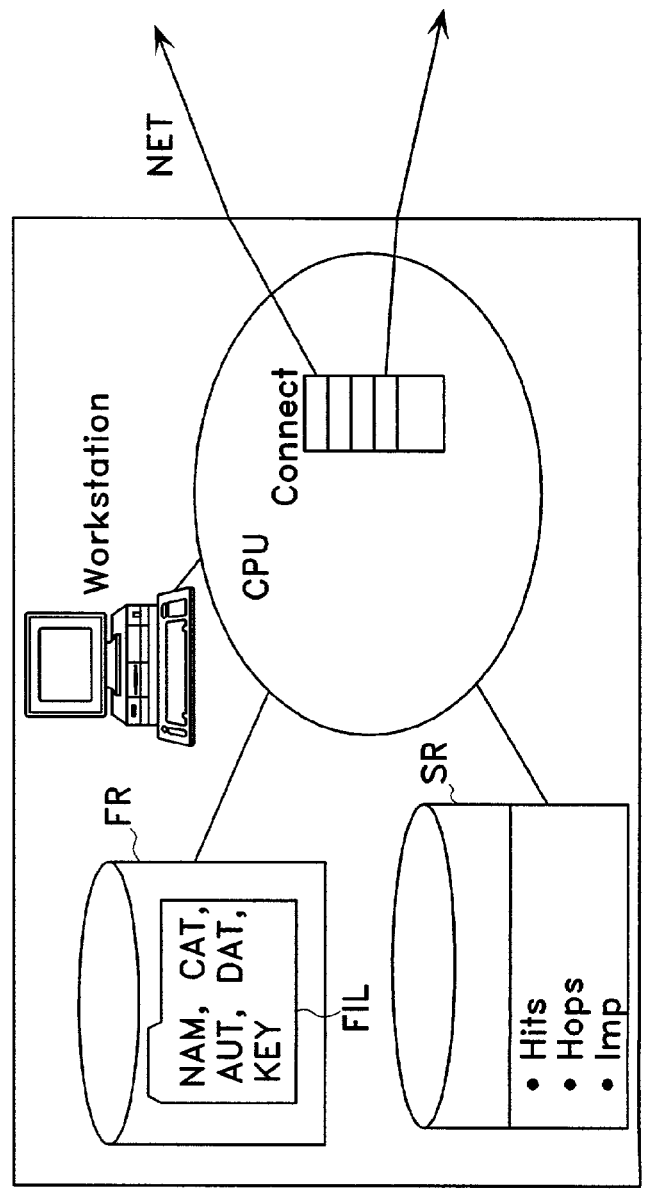
FIG. 2 depicts certain physical subsystems associated with an exemplary node of the peer-to-peer network of FIG. 1, including a File Repository, a Scores Repository, and connections to the peer-to-peer network.

As shown in FIG. 2, each peer typically maintains a local repository FR of files that are potentially available to other members of the peer-to-peer network NET (see also FIG. 1). Each file FIL is characterized by meta-data. The meta-data may include the title NAM of the file, the topic CAT, the author AUT, the generation (and possibly expiry) date DAT and keywords KEY. The network node (e.g., node A of FIG. 1) associated with a given peer is also characterized by its physical capabilities. Its processor CPU may be characterized by its CPU speed, the size of its local memory MEM and the size of its disk space FR. The node also has a limited amount of bandwidth to the network NET. To give high priority to the node's request and potentially other functions, including direct file transfers from other peers, the bandwidth used for incoming requests propagated by other peers is preferably limited to be a small proportion of the total bandwidth on the available communication links. Since that bandwidth is a function of the number of direct connections to its immediate peers, the number of immediate peers con (three for node A in FIG. 1) and thus the number of such direct connections, will typically be limited to substantially less than could be physically accommodated.

Figure 6:
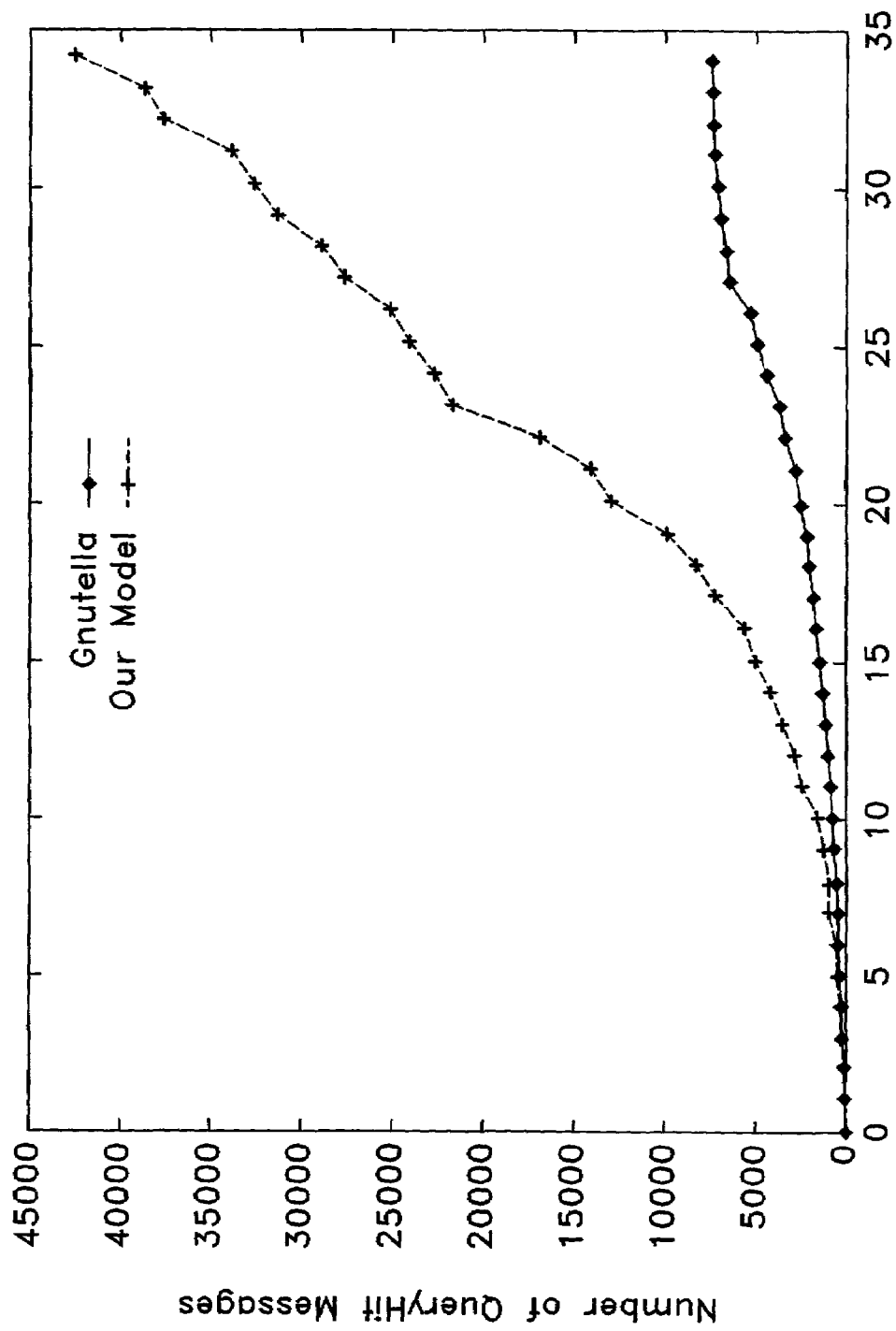
FIG. 6 is a graph comparing the cumulative received Hits in the first scenario with comparable statistics for a conventional Gnutella network.

Each peer node sends Query messages to search for files among its peers, which typically includes not only the actual Query content (the Payload), but also a message Header (described in more detail hereinafter with respect to FIG. 6). Its peers will in turn forward the Query messages to their own peers and so on, with the maximum number of hops from one peer to the next being limited by a predetermined Horizon value hor for a given Query. In general, a Query will thus be propagated $con^{hor}$ times and a large value for Horizon Hor thus results in an exponentially larger number of messages propagated in the network. Conversely, a reduced Horizon reduces not only the number of messages but also frees up communication resources for other applications.

As shown in FIG. 2, each peer preferably maintains the following statistical information for each of its peers (both Immediate and Indirect peers) from which it receives replies to its queries:

Hits: a computed metric that represents the number of replies received from the peer being measured. This provides a simplified measure of the measured peer's ability to respond to various queries from the local peer node and thus of their similarity in interests (which may be reflected not only in the information stored at the peer being measured but also in the direct connections that are maintained, for example, by an Immediate Peer), and is used in the ranking of both Immediate Peers and of Indirect Peers. Note that in the Gnutella protocol each message is given a unique ID by the originating node such that each peer filters out duplicate copies of the same Query from the same original requestor that may have been received over different connections, but may forward multiple replies from different responding nodes to that Query. Thus a single Query will typically produce a number of replies from Peers at varying distance (Hops). Moreover, even though the Payload of a Gnutella reply identifies only the Peer who positively responded to the Query, the identity of the involved Immediate Peer is also known, because the reply follows the same path as the Query and the identity of the Peer that forwarded the reply (i.e., the involved Immediate Peer) is known from the message header received at the local peer. In other protocols data may be unavailable concerning the potential value of nodes other than the first to respond to a given query, but even in that case, as a result of dynamic changes in network congestion, connectivity, and other pseudo-random factors, the peer responding second to one query may be the first to respond to a later query from the same source, and thus may eventually be identified as also having interests in common with those of the first peer.

Hops: a computed metric that represents the network distance (for example, the average number of hops) traveled by each positive reply to reach the measuring Node via a particular Immediate Peer. The reciprocal 1/Hops provides a simplified measure of the Immediate Peer's network efficiency and the timeliness of its responses, and is available for the calculation of the Importance of the Immediate Peers. In the Gnutella protocol, each message header includes a count of the actual number of hops traversed. In other protocols, this specific information may not be available, in which case other measures of communication efficiency such as time of transmission and/or time of receipt of a positive response may be used.

Imp: a calculated metric that represents the relative Importance of each such Immediate Peer and that preferably takes into account the Immediate Peer's Hits and Hops metrics. Different peers will have different interests and will initiate different Queries; different peers will thus calculate different Importance values for the same Immediate Peer. Importance is preferably time weighted and reflects both current and past performance, thereby taking into account not only recent reconfigurations of the network, but also the reliability and dependability of the Immediate Peer over a longer period of time.

Establishing Connections to other Peers

The peers in the network communicate by exchanging messages. Each node maintains an ordered list CONNECT (FIG. 2) of known peers in the network, including those former Immediate Peers with which the node had previous connections to and is likely to connect to in the future as well as all Indirect Peers that have responded recently to any previous Query. The peer list is updated dynamically based on the user's interests and ordered based on the relative importance of the peers. Since the nodes are not always physically connected to the network, some of these peers may not be active when the node tries to connect to them. Peers that have a history of prolonged inactivity or that otherwise have a low probability of future use, may be dropped from the Connect list, although such negative information does have some potential value in avoiding potentially futile future attempts to establish a new connection with a known bad peer.

A node connects itself to the network of peers by establishing a connection with at least one peer currently on the network. If its locally stored peer list does not include any suitable peer to connect to that is currently active, the node can contact a centralized server or a host cache to get a supplemental list of other currently active peers in the network, or even can attempt to contact ("ping") randomly generated addressees until a previously unknown active peer responds. In many networks there are specific services called name servers from which a node may obtain a distribution list or group name for related groups of nodes of which it is a member. An attempt to establish a connection to such a group can be considered as an initial thrust for the node to find a group of peers with similar interests. Because a given node will typically be a member of more than one group, and file requests will potentially be propagated to other nodes that are members of other groups, such an initial group-oriented connection strategy will not necessarily limit the node's horizon to the members of the group used to establish the initial connection.

Figures 3, 4, 5:
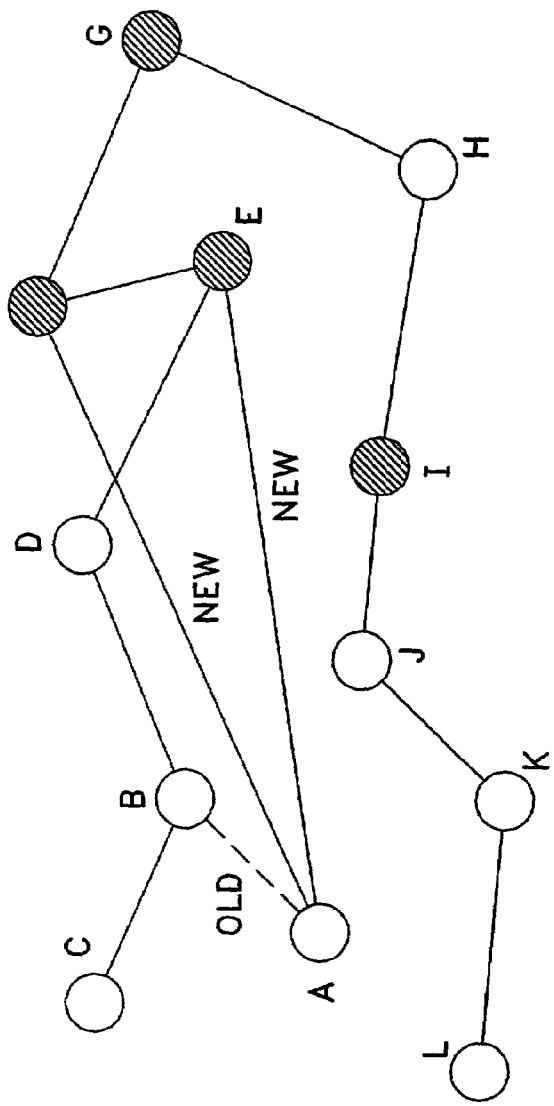
FIG. 3 depicts the format of an exemplary peer-to-peer message that may be used by the node of FIG. 2.
FIG. 4 depicts an illustrative network of four peers, including two Immediate Peers and one Indirect Peer, showing how Hits, Hops and Imp may be calculated for each.
FIG. 5 depicts the topology of a network used in a first experimental scenario.

Reference should now be made to the format of an exemplary Peer-to-Peer message shown in FIG. 3. To connect to the network of peers, the node constructs a Connect message containing a Universally Unique Identifier UUID that uniquely identifies that particular message and an associated DESCRIPTOR_ID (his address in the underlying physical network) that uniquely identifies the sender of the message, the Connect payload descriptor, the number of times (TTL) the message can be further propagated in the network, the number of HOPS the message has already traveled and the size of any attached Payload. In the case of a Connect message, the name of a predetermined group (GROUP_ID) may replace the network address of the node (NODE_ID) to which the message is being sent. The Connect message is then used to actively probe the network for peers.

When a node receives a Connect message, it decides whether it should accept the connection from its peer (the probing node) and if so, it replies with an AcceptConnection message. The probed node may simply decide to accept a connection if the number of its peers is less than the maximum number of connections MAX_CONNECTIONS it can accept, which is typically determined by a number of known factors, such as its local resource capabilities and the available bandwidth on its communication links. Alternatively, a decision to accept the proposed connection can be based at least in part on prior experience, with the node being probed responding positively to a peer with which it had a stable connection in the past than to another peer that was frequently disconnecting.

If the node receiving a Connect message decides not to accept the proposed connection (for example, because all its available peer-to-peer connections are already in use), and the TTL counter in the massage header indicates that the message has not yet expired, the receiving node preferably forwards the message to each of its directly connected peers, or at least to those that are members of the identified group (GROUP_ID). AcceptConnection replies are forwarded directly to the probing node.

When the probing node receives the AcceptConnection message, it extracts the sender's IP_ADDRESS from the message header and, assuming that additional direct connections are still available, connects to the accepting peer. Also, the probing node preferably should update its peer list to include the accepting peer's address (if not already included) not only as a possible candidate for future probes and connections, but also so that a local record of its importance may be maintained.

A node can disconnect at any time from the entire network or can drop a direct connection to any of its immediate peers, with or without any advance warning to the affected peers. In either case, each affected peer may then decide whether it should issue a Connect message to find another peer to replace the dropped connection.

Searching in the Network

In a typical peer-to-peer search network, each peer node maintains a local repository of files. Each file is characterized by meta-data describing the file's contents. The most basic form of meta-data is simply a file name. Other meta-data schemes might include additional information such as the author of the file, its creation date and so on. Peers supplement the files in their local repository by exchanging messages with other peers. A node searches in the network by sending Query messages to its peers. The Payload of a Query message contains a meta-data Constraint that will be evaluated locally in each peer to identify and/or rank those files (if any) in its own local repository that meet that constraint. Typically, the Constraint includes a set of keywords, such as possible authors or topics that may be associated with the files of interest, but could also identify a specific file, or even a specific version of a specific file.

When the node receives a Query message, it first determines (from the UUID field) whether this is a new Query, or a duplicate of a previous Query received over a different routing path. Assuming that it is a new Query, the receiving node evaluates the Constraint in the message Payload against the meta-data of the documents in its local repository. If the Constraint evaluates successfully, the node generates a QueryHit message that includes in its Payload the physical address of the responding Peer and a pointer to one or more locally stored files that satisfy the constraint. In alternative embodiments using different protocols, the reply could include either the entire file contents, or just an associated abstract and/or other relevant metadata. The QueryHit message is then returned to the node that initiated the search. In a network with symmetrical Peer-to-Peer connections (such as Gnutella) in which only its approved Immediate Peers know the identity of the Query submitter, the message is returned using the same path, and will be finally forwarded to the Query originator from the particular Immediate Peer to which the Query message was originally directed.

Every time a Query, QueryHit or other Gnutella message is forwarded, the forwarding node decrements the TTL value and increments the Hops value in the message's header, prior to forwarding the Query message to each of its immediate peers. To provide a termination condition so that messages are not propagated indefinitely in the network, a node that receives a message with TTL value zero, stops forwarding the message. Alternatively, if the receiving node is able to respond to the Query with a high degree of confidence that it has the specific file being requested (for example, it has a recently verified copy of a specific file being requested), it may decide not to propagate the Query to other nodes even if the TTL value is not yet zero, thereby reducing the network bandwidth required for further propagation of the Query.

When the QueryHit messages reach the node that initiated the search, they are stored in a buffer until the replies from all the peers are collected. The order with which the replies are processed (identified to the user and/or downloaded) is preferably based on each file's reputation value (a figure of merit calculated by the responding node that is indicative of how well the file's metadata and/or contents fits the particular constraint). The node records the source identity for each of the replies it receives (whether originated from immediate or the indirect peers) and also if the reply was obtained from an indirect peer, the identity of the immediate peers involved, so that both the source and any other directly involved peer may be given credit for the reply. In another implementation, the stored results will include not only the identity of the involved peers and the number of hops required to propagate each received reply, but also the relative speed and reputation of each reply.

The Role of the Immediate Peers

Each peer node in the network has information about its immediate peers. For example, it knows the logical (one hop) and physical (IP address) distance of all the Immediate Peers with which it is currently connected. Also, the node discovers files of interest that are maintained by the immediate peers and thus is able to determine the interests of those Immediate Peers by sending search requests and recording their replies. Similarly, information about any indirect peers in the immediate vicinity of a particular Immediate Peer is also available in the form of Query and QueryHit messages routed through that Immediate Peer. When a node sends a Query message to its immediate peers, they will propagate the message to their own immediate peers. Replies from indirect peers are sent through the same path back to the originating node. Node p records all the replies it receives to its search requests, both from its immediate and indirect peers. Note though that a peer node's view about its indirect peers may not be complete, because there will not always be available connections within the node's horizon to all the peers in the network and furthermore, because not all connected indirect peers will reply to the node's requests. However, since, as will be explained in more detail hereinafter, the virtual topology of the search network changes dynamically both as a result of changes to the connections to existing peers and the addition of new peers, additional information about other indirect peers may become available.

Assume that Peer node p generates a Query message $Query_q(p)$ and sends it to each Immediate Peer q. The Immediate Peer q will in turn propagate the message to each of its own Immediate Peers s. Let $QueryHits_{p,q}(s)$ be the number of QueryHit messages generated as replies from an indirect node s and sent to node p through the Immediate Peer q. Let $numHops_p(s)$ be the logical distance between Peers p and s at the time of the request—the distance between the two peers may subsequently change (grow or shrink). The node p computes the average number of hops of its immediate peer q as:

$$averNumHops_p(q) = \frac{\sum_s (QueryHits_{p,q}(s) * numHops_p(s))}{\sum_s \sum_q QueryHits_{p,q}(s)} \quad (1)$$

This equation computes the number of hops taken, in average, for replies that come through the immediate peer q (generated either by q or by an indirect peer s) to reach node p. $QueryHits_{p,q}(s)$ represents the number of replies generated by peer s and sent to node p through its immediate peer q. The distance a QueryHit message has traveled ($numHops_p(s)$) is given by the Hops field in the QueryHit message header when it reaches node p. Those replies that originate from indirect peers $s_i$ may be considered as contributing to the relative importance of the immediate peer q in inverse proportion to the logical distance NumHops from the immediate peer q. An immediate peer q with a large average number of hops averNumHops indicates that it receives replies from peers that are located farther from the requesting node, and thus is imposing higher demands on the available resources.

The values of the averNumHops metric are illustrated in the following example. Consider a network of four peers A, B, C and D as shown in FIG. 4. Let nodes B and C be immediate peers to node A and let node D be an immediate peer to node B (therefore, an indirect peer to node A). Assume that nodes B, C and D give 80, 100 and 20 QueryHits, respectively, as a reply to queries from node A. Note here that both peers B and C give a relatively high number of QueryHits. Note also that through peer B, node A receives replies from other peers, such as node D and the total number of QueryHits that come through node B is equal to the total number of QueryHits that come through node C (=100).

Note though that, even if an immediate peer does not generate any replies for the search request, this does not necessarily mean that it is not a "good" peer, because of two reasons: (1) the peer may give good results for other subsequent queries and, (2) it propagates the search messages to indirect peers in the network and if the requesting Peer p disconnects from this immediate peer, it may lose connection to those peers $s_i$. By using the number of hops required for each positive response when calculating the importance of the immediate peer, a more informed decision can be made (as will be described in more detail hereinafter) as to whether the direct connection to this immediate peer should be replaced with a connection to another peer that will potentially be more productive but which potentially could also reduce the value of other Indirect Peers that responded via the previously connected Immediate Peer.

Evaluating the Peers

The relative contributions (the raw "value") from each peer s known to a particular node p over a predetermined time interval $\{t-1,t\}$ are first computed as follows. Let QueryHits$_p$(s) be the number of replies received by node p in response to p's Queries that originated from Peer s (or that were received via Peer s if s is an Immediate Peer). The percentage of QueryHit messages associated with node s relative to all the QueryHit messages received from all nodes r via all immediate nodes q is denoted by percQueryHitsp(s) and is computed as follows:

$$percQueryHits_p(s) = \frac{QueryHits_p(s)}{\sum_r \sum_q QueryHits_{p,q}(r)} \quad (2)$$

A peer s with a high value of percQueryHits is considered to be a "good" peer and the percQueryHits(s) during the current evaluation period provides a first approximation of that peer's interests and therefore of its importance.

As noted above with respect to equation (1), for an immediate peer q, peer p typically has additional information that can also be taken into account in determining its relative worth. In particular, node p knows not only which peer s originated a particular reply, but also which immediate peer q was responsible for forwarding (or originating) that reply, and the logical distance (number of hops) to both the originating peer s and the forwarding peer q. Giving the Immediate Peer credit not only for files which it maintains locally, but also for files on other Peers with which it maintains direct or indirect connections acknowledges the important role such indirect connections play in a Peer-to-Peer network and enable a Peer to be accorded a high score and remain connected even if it does not itself have a large number of the files being requested. On the other hand, an Immediate peer with a large average number of hops indicates that it propagates replies from peers that are located farther from the requesting node, and thus makes a higher demand on network resources than an intermediate peer which either is able to respond directly without forwarding the Query to other nodes, or can obtain replies from peers that are relatively close to the requesting node. Thus, as a first approximation, the replies that originate from indirect peers contribute to the relative importance of the immediate peer q in inverse proportion to the logical distance from the immediate peer, and its importance during the current evaluation period may be computed as follows:

$$Imp_p(q) = \frac{percQueryHits_p(q)}{averNumHops_p(q)} \quad (3)$$

As noted previously, a decision whether to connect to or disconnect from a given Intermediate peer preferably takes into account not only its recent behavior, but also its history. A peer that is highly reliable and that is able to adapt to changing demands is more valuable than a peer with erratic behavior, or that only occasionally provides good results. Thus, Equation (3) may be modified to take into account the historical performance of the peer being evaluated, using an exponentially weighted average of a sequence of previous measurements, with greater weight being given to more recent measurements:

$$Imp_p(q, t) = \alpha * \frac{percQueryHits_p(q)}{averNumHops_p(q)} + \beta * Imp_p(q, t-1) \quad (4)$$

wherein Imp$_p$(q,t) represents the historical Importance of Peer q to Peer p through the current evaluation period (i.e., after all replies have been received to a given Query), and Imp$_p$ (q,t−1) represents the historical Importance of that same Peer q during a previous evaluation. An evaluation period may be defined as a fixed period of time, but more conveniently it is defined in terms of all the replies to a single query received at time t. Note that equation (4) may also be used to measure the time-weighted importance of an Indirect Peer if the number of hops averNumHops is fixed at one.

If $\alpha+\beta=1$ and the number of connections is stable, the time weighted Importance given by Equation (4) will converge to the instantaneous importance given by Equation (3). However, if the behavior of the node being measured changes dynamically, Equation (4) will tend to track current behavior with a large value of $\alpha$ yielding rapid response to changing conditions, and a large value of $\beta$ yielding more smoothing and less noise. If $\alpha+\beta>1$ then Importance will drift higher over time thereby favoring a more reliable connection by setting its Importance higher. Typical values for $\alpha$ are in the approximate range of 0.3 to 0.4, and typical values for $\beta$ are in the approximate range of 0.7 to 0.8.

Dynamic Selection of Appropriate Peers

Periodically, each local node compares the relative interest-based performance of all its immediate peers and at least those indirect peers that have responding positively to recently Queries. The local node decides to make an indirect peer an immediate peer, when the current importance of that indirect peer becomes greater than the corresponding importance of at least one of the existing immediate peers. In that case, the local node probes the identified indirect peer in an attempt to make a direct connection. If the identified peer node accepts the connection, a direct connection between the two nodes is established. If the local node has then exceeded its maximum number of connections MAX_CONNECTIONS, it then removes the Immediate peer making the least contribution (preferably measured in terms of the previously discussed time-weighted Importance). An exemplary pseudocode for the PeerSelection procedure at local peer node p may thus be as follows:

for all peers s,q known to Peer p
   find Indirect Peer $s_i$ with maximum percQueryHits$_p$(s)
   find Immediate Peer $q_j$ with least Imp$_p$(q,t)
   if percQueryHits$_p$($s_i$)>=percQueryHits$_p$($q_j$)
     make a direct connection from Peer p to Peer $s_i$
     if numConnection$_p$>=MAX_CONNECTIONS
     remove Immediate Peer $q_k$ with least Imp$_p$(q,t)
   else numConnection$_p$++

This procedure is preferably run at more or less regular intervals based on the already accumulated results of several evaluation cycles, but could in theory be repeated at the end of each evaluation cycle t.

This PeerSelection procedure determines "good" peers as peers with high importance. These are peers that provide a high percentage of QueryHits and are connected over the longest time period. The advantage is, that, if two peers are directly connected together over a long period of time, this is a strong indication that the peers have similar interests and should remain connected. However, rather than using the previously defined time-weighted Importance score, the selection of a new Immediate Peer could instead or in addition be based on other historical measurements of performance, or alternatively, could be based only on recent performance. In any event, it is desirable that the performance of Immediate Peers be evaluated in a manner that rewards not only common interests, but also availability and connectivity to other "good" peers, so that indirect connections to those other good peers are not inadvertently lost.

Stability and Reliability Considerations

The stability of the system is affected by the frequency with which nodes make connections to new peers and disconnect from old ones which, in turn, is greatly influenced by the user's behavior. For example, if the user is actively searching for articles in the encyclopedia on a subject that he has not previously researched, there is a relatively high probability that the PeerSelection process will find more suitable peers with which a direct connection should be established. On the other hand, if the user is inactive, the PeerSelection process will not have any new data on which to base any connection or disconnection decisions and will effectively be idle. For example, users may typically read topical news articles in the morning, play background music in the afternoon, and watch videos in the evening, so that there are many searches being launched during the early hours and less traffic the rest of the day. Moreover, the "interest" of the user is not static, so what would be considered a "good" peer for current events may not be a "good" peer for music or video entertainment. Even within a particular field such as "music", depending on the day's events, the user may one day be more interested in one musical genre and another day in another genre. By monitoring the user requests and the replies sent from the peers, the disclosed PeerSelection process is able to connect peers with similar current interests and to dynamically adjust the connections between "good" peer as the behavior of the users or the peers change. But because the importance of existing direct connections to Immediate Peers is measured in terms not only of commonality of current interest, but also in terms of network efficiency and historical performance, a temporary change in the user's interest should not needlessly cause an otherwise valuable Peer to be connected and disconnected in rapid succession.

Experimental Validation

We used two scenarios to observe the working of our PeerSelection methodology in the peer-to-peer network. In the first scenario, we determine how accurately and quickly a peer is able to find other peers with similar interests. In the second, we see how the disclosed selection process adapts a peer's connections as the interests are changed. These experimental results were obtained from operational systems, not from simulations, and involved a relatively small number of peers and connections. However, we believe the system architecture, metrics, and selection process can be readily scaled to much larger networks.

Scenario 1

A real time experiment was conducted with 12 peers with each of them generating queries based on assigned interests. We monitored the state of peer A and restricted it to a maximum of two connections. We also set the initial TTL of its query messages to three. Peers with filled circles represent those with interests similar to our querying peer, A. That is, they are more likely to be able to return results for a given query: The darker the circle, the more similar the interests. Each peer also maintained a set of "content" files that other peers may find. Each content file has metadata associated with it containing a title, topic, keywords and rank. Five hundred queries were generated during the test, and the results were compared to a standard Gnutella protocol. A query hit was defined to occur only when the query matched completely either with one of the keywords or the title of the file.

FIG. 4 shows the topology of the network used in that experiment. The dotted line OLD indicates an existing connection at the initial topology. The darker lines NEW represent the new connections formed by peer node A at the final topology. A white node (such as B) indicates a peer having few files of interest, while a dark node (such as F) indicates a peer having many files of interest. Peer A broke its initial connection to peer B, and made two new connections to peers E and F with similar interests. We also observed that the querying peer (A) made only 6 to 7 "reconnection" decisions before coming to a stable state and these decisions are made near the beginning of the experiment. The large number of reconnection decisions during initialization can be attributed to the near "zero knowledge" of the peer connections. Over time, the peer learns about good connections and gets connected to more stable and more important peers. This leads to a decrease in the number of reconnection decisions later. Once the peer got a good set of immediate peers, the reconnections decisions are made rarely and are mostly related to change in the kind of queries being sent, which is a good indicator of the system's overall stability. By comparison, we observed in a pure Gnutella implementation of the same initial network configuration but without any adaptive performance-based peer selection procedure, only query hits from peer E are received because of the TTL limit of 3 even though other peers with relevant information are in the network. This demonstrates the "so near, yet so far" nature of the Gnutella protocol. Four peers (B, C, D, and E) were contacted only to get the results from one of them (peer E). This resulted not only in fewer query hits for A, but also wasted resources (bandwidth and query processing time) of the "just" forwarding nodes (peers B and D).

In the disclosed dynamic PeerSelection model, A found F to be a good peer and made it an immediate peer. This resulted in the useful nodes just 2 (peer G) or 4 (peer I) hops away from A. In course of time, they connected to A directly. This had two advantages:

More query hits received by A. This is shown in FIG. 6. Notice how the number of hits grows dramatically and continues to outpace the pure Gnutella implementation. This is directly due to the use of a dynamic Peer Selection process that is capable of finding and connecting to peers with a history of providing results.

Figure 7:
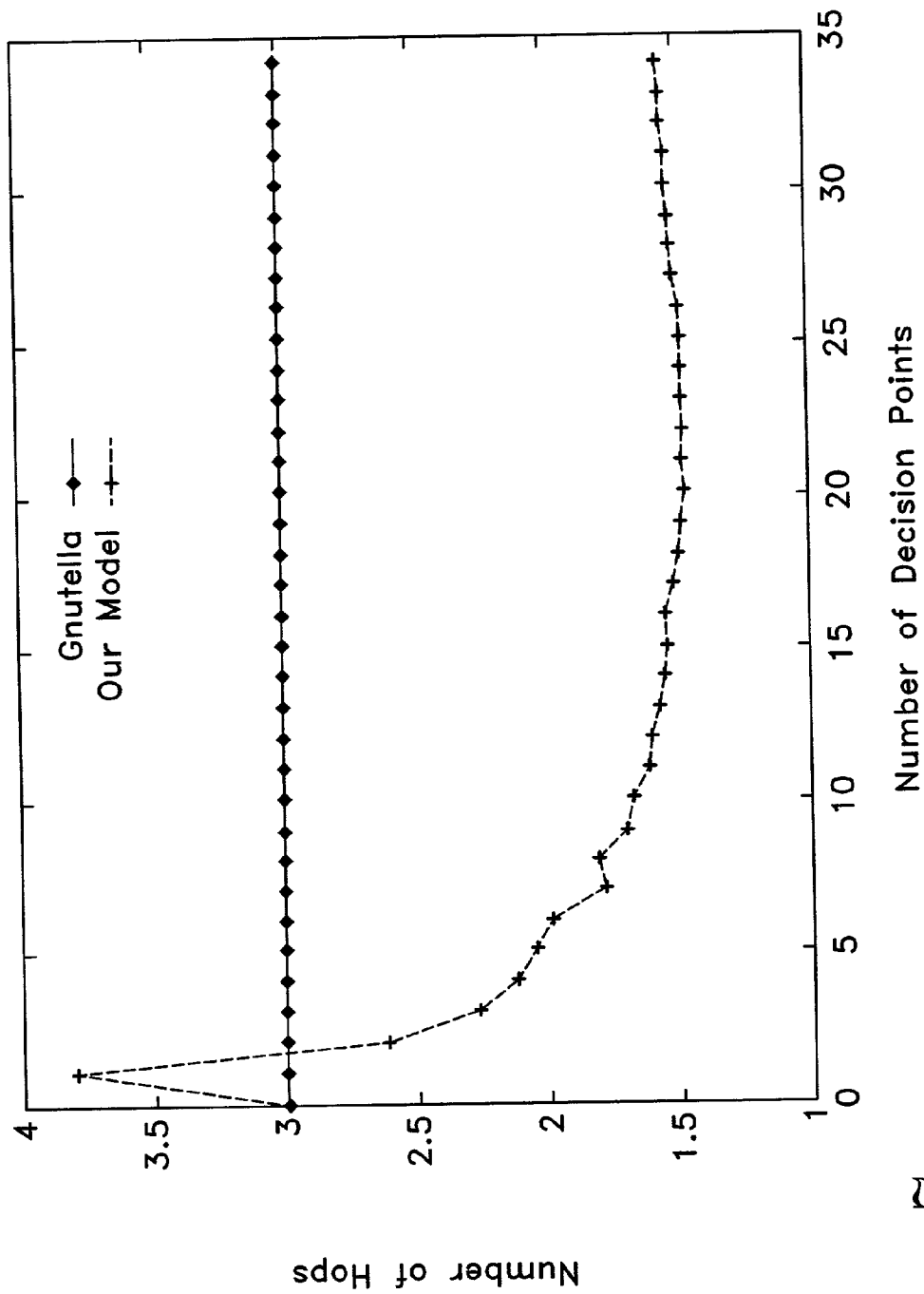
FIG. 7 is a graph comparing the mean number of Hops in the first scenario with comparable statistics for a conventional Gnutella network.
Figure 8:
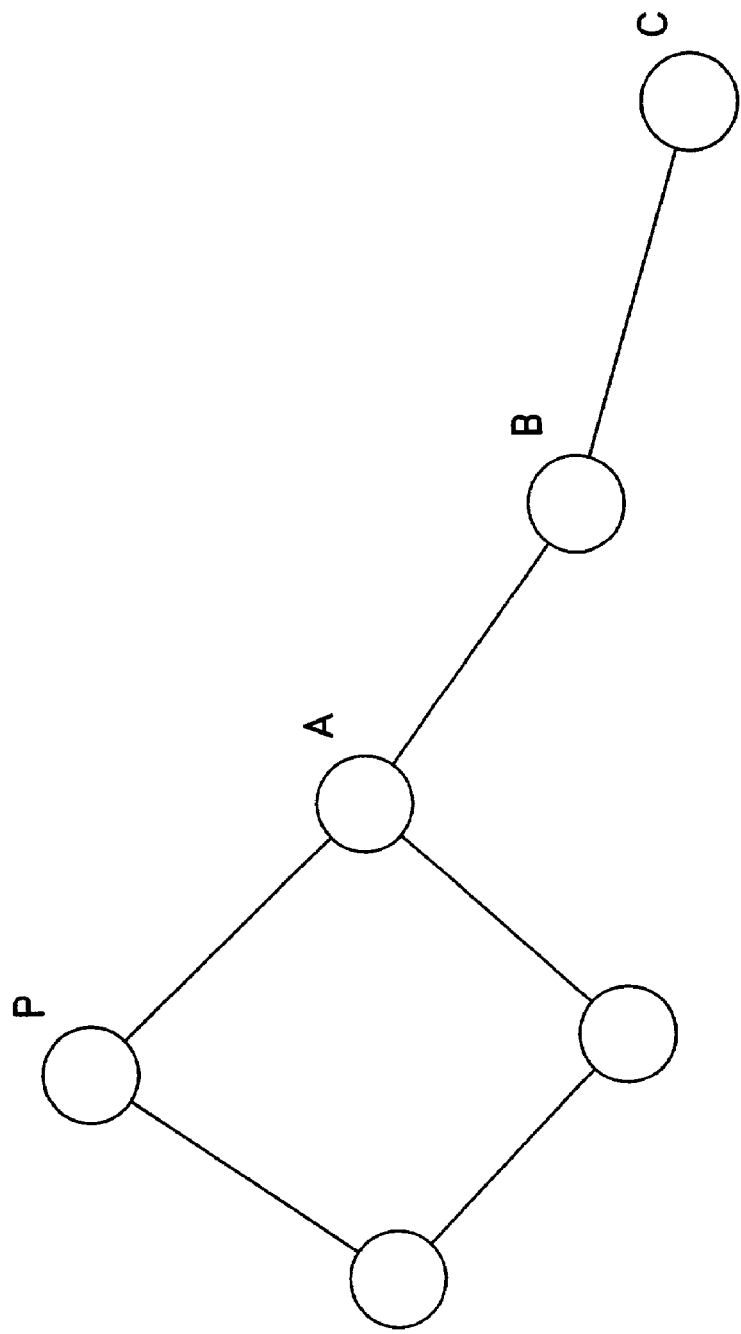
FIG. 8 depicts the topology of a network used in a second experimental scenario.

Fewer messages were propagated in the network. FIG. 7 shows the mean number of hops a query hit must traverse before returning to the search peer. After a brief instability when the querying peer is searching for good peers, the number dramatically decreases. This reduces bandwidth used by query response messages, and could be used as an indication that horizon can be reduced which reduces the propagating of query messages as well.

Scenario 2

In this scenario we determined how the above-described PeerSelection procedure adapts as the interests of a peer change over time. Six nodes were used for this experiment with 1500 queries being sent from the querying peer (FIG. 7). We assumed 3 peers containing documents related to different topics, A, B, C respectively. The querying peer (P) sent out a query stream of the form: 5A's, 50B's, 100C's, 150A's, 150B's, 500C's, 300A's, 100B's where peer A has the data requested by the A queries, peer B has the data for the B queries and so forth.

Figure 9:
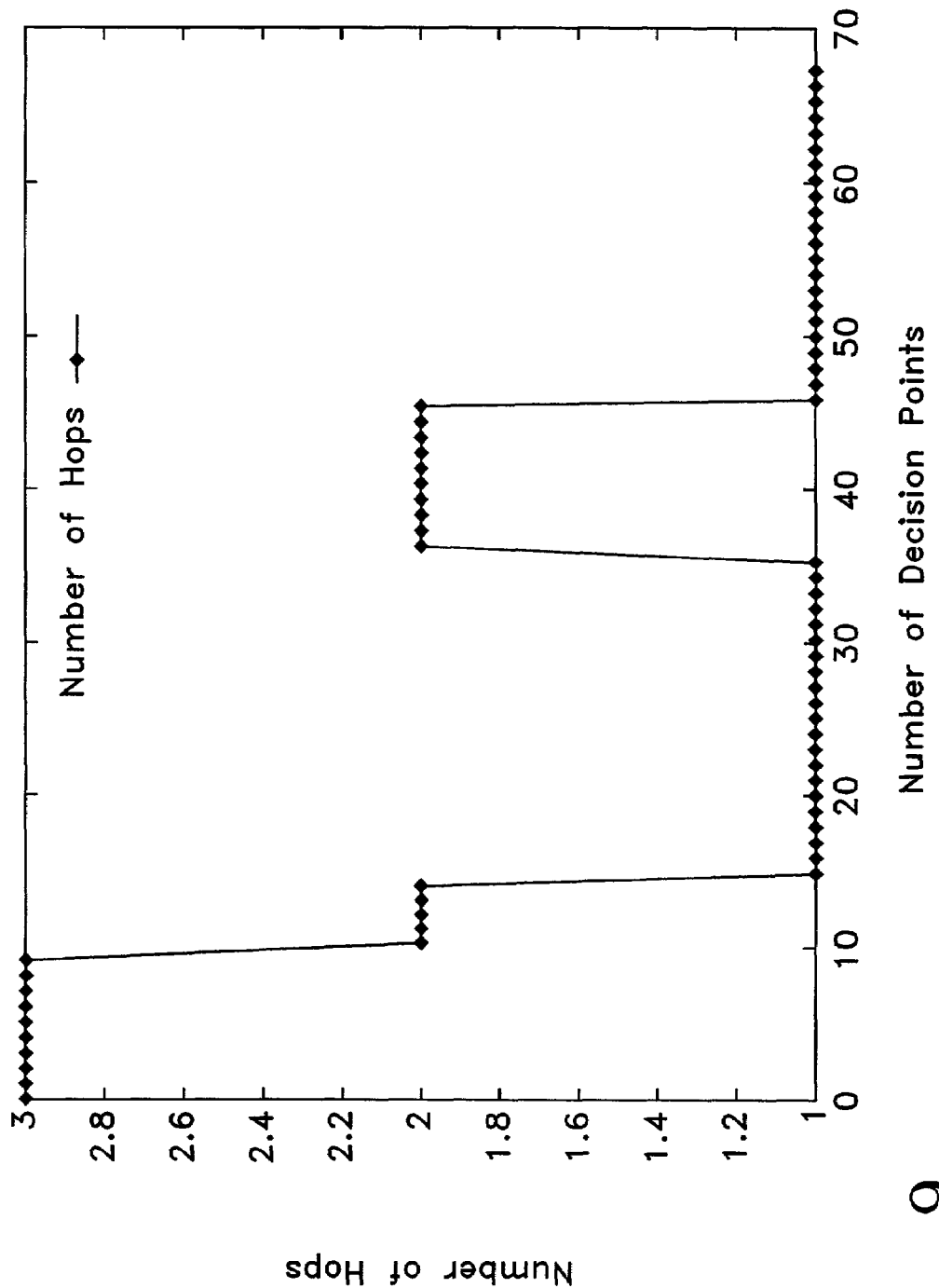
FIG. 9 is a graph showing how the number of Hops in the second scenario changes over time.

The initial TTL on the query messages was set at two, and each peer was limited to two simultaneous connections. When the 50 B's were sent, B became the immediate peer of the querying peer, which correlates closely with the results in Scenario 1. However, we observed that disconnection decisions were not made immediately after a change in the type of query message being generated. Instead, some time evidencing a consistent change of behavior was required before changes were made. FIG. 9 depicts the number of message hops required to reach one of the type-C peers from the querying peer. The distance changed (both nearer and further) as the querying peer's interest changed, but is not in lock step with the change in query type being generated. This gradual movement of the peers is important, as it is indicative of a reduced instability factor.

Figure 10:
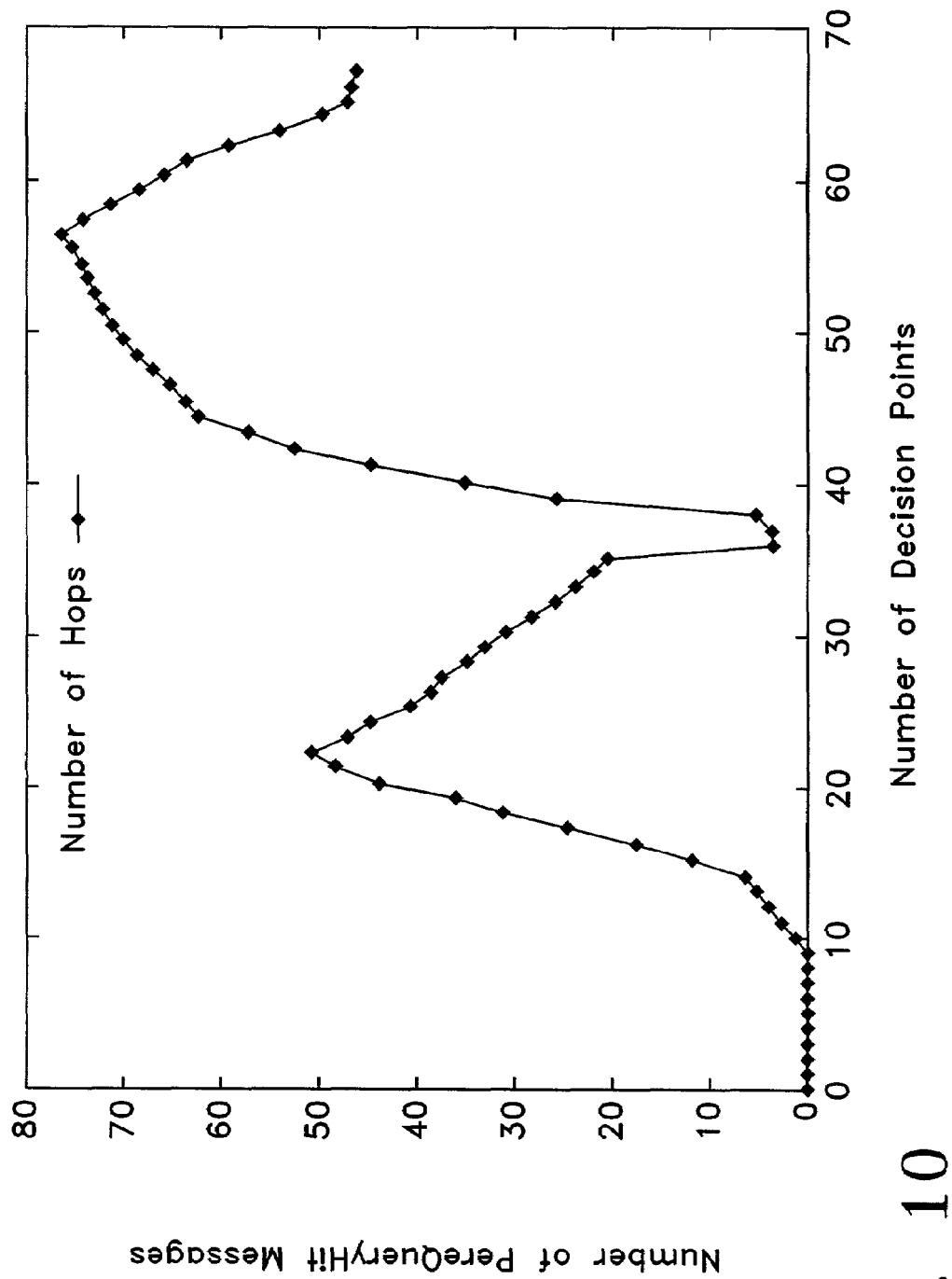
FIG. 10 is a graph showing how the number of Hits in the second scenario changes over time.

FIG. 10 further demonstrates the adaptability of the disclosed procedure. As interests change, the number of successful queries dropped dramatically. But, as the peer created new connections to replace old ones, the success rate increases. Again, there is lag in the time until the rate increases, but this is counterbalanced by increased stability in the case where the interest changes are brief.

CONCLUSION

The experimental results confirm that the disclosed method and apparatus for establishing and maintaining connections in a peer-to-peer network is both effective and stable in creating logical clusters of peer network nodes having common interests.

The invention claimed is:

1. A method for reconfiguring a node in a peer-to-peer network, comprising:

maintaining a list of addressable nodes on the peer-to-peer network and identifying which are currently considered immediate peers and which are considered indirect peers;

generating a query message to each of the immediate peers for subsequent preparation of a reply message or for forwarding to one or more other peers for a reply;

receiving at least a first unique reply to said query message;

maintaining statistical information on unique replies originating both from said immediate peers and from said indirect peers;

calculating a first metric for at least three peers in the peer-to-peer network, including directly connected first and second immediate peers and an indirect third peer that is not directly connected to the node being reconfigured, calculating a second metric for at least the first and second immediate peers, and dropping the direct connection to said second peer and establishing a direct connection to said third peer if the calculated first metric for the third peer is greater than a corresponding first metric for at least one of the first and second immediate peers and the calculated second metric value for the second peer is less than a corresponding second metric value for other immediate peers.

2. The method of claim 1 wherein at least the first metric is representative of the peer's interests and measures for an immediate peer not only received content originating at that immediate peer, but also received content received from indirect peers in response to queries forwarded by that indirect peer.

3. The method of claim 2 wherein at least the second metric also includes a measure of the logical distance between the local peer originating the query and a remote peer associated with the received content.

4. The method of claim 3 wherein at least the second metric takes into account a time weighted average of previous calculations of said second metric.

5. A method for dynamically measuring the current importance of a directly connected peer in a peer-to-peer network, comprising:

maintaining a list of said addressable nodes and identifying which are currently considered immediate peers and which are considered indirect peers;

generating a query message to each of the immediate peers for subsequent preparation of a reply message or for forwarding to one or more other peers for a reply;

receiving at least a first unique reply to said query message;

maintaining statistical information on unique replies originating both from said immediate peers and from said indirect peers;

calculating a first factor representative of the current contribution of a peer in the peer-to-peer network, measured based at least in part on the number of unique replies first received via said peer;

calculating a second factor representative of the current efficiency of the peer being measured based at least in part on the number of hops traveled by the first unique replies received via said peer;

using both said first factor and said second factor to calculate said current importance; and replacing one of the immediate peers based on the calculated current importance.

6. The method of claim 5 further comprising the step of calculating a time weighted importance derived from at least two successive current importance calculations.

7. The method of claim 6 wherein said time weighted average importance gives a higher ranking to a connection that maintains a relatively high contribution and a relatively high efficiency over a relatively long period of time.

8. The method of claim 6 wherein said time weighted average importance gives a greater weight to a more recent measurement.

9. A dynamically reconfigurable peer-peer network comprising a plurality of physically connected addressable nodes, each said node comprising:

an addressing module for maintaining a list of said addressable nodes and identifying which are currently considered immediate peers and which are considered indirect peers;

a query module for generating a query message to each of the immediate peers for subsequent preparation of a reply message or for forwarding to one or more other peers for a reply;

a response module for receiving at least a first unique reply to said query message;

a history module for maintaining statistical information on unique replies originating both from said immediate peers and from said indirect peers;

a calculator module for calculating;

a contribution score for each of said peers based at least in part on the number of unique first replies originating at or received via the peer being measured over a predetermined period of time, and an importance score for at least each of said immediate peers based at least in part on the logical distance to the peer from which each said unique first reply originated; and a reconfiguration module responsive to the addressing module and to the calculator module for replacing a direct peer-to-peer connection to an immediate peer having a first importance score with a corresponding connection to an indirect peer having a second contribution score, the second contribution score being higher than the first contribution score.

10. The network of claim 9 wherein said importance score is also based on a corresponding said contribution score.

11. The network of claim 10 wherein said importance score is a time weighted importance derived from at least two successive importance score calculations.

12. The network of claim 11 wherein said time weighted importance gives a higher ranking to a connection that maintains a relatively high said contribution and a relatively said logical distance over a relatively long period of time.

13. The network of claim 11 wherein said time weighted importance gives a greater weight to a more recent measurement.

14. A node in a peer-to-peer network, comprising:

a query module configured to transmit queries to the node's immediate peers over the peer-to-peer network;

a reception module configured to receive at least a first unique reply to said query message;

a history module configured to maintain statistical information on unique replies originating both from said immediate peers and from indirect peers on the peer-to-peer network;

an evaluation module configured periodically evaluate importance of the immediate and indirect peers on the peer-to-peer network based at least in part on at least one of (i) a number of unique first replies originating at or received via the peer being measured over a predetermined period of time, and (ii) a logical distance to the peer from which each said unique first reply originated; and a reconfiguration module configured to modify who the node's immediate peers are based on results provided by the evaluation module.

15. A node according to claim 14, wherein the importance of a peer is determined by the evaluation module based on a quantity of responses received from that peer.

16. A node according to claim 15, wherein the importance of the peer also is determined by the evaluation module based on a logical distance associated with a response.

17. A node according to claim 14, wherein the importance of a peer is determined by the evaluation module by giving greater importance to more recent responses.

18. A node according to claim 14, wherein the number of the immediate peers is limited to a specified maximum so that when the maximum is reached, an addition of another immediate peer requires removal of an existing immediate peer.

19. A node according to claim 18, wherein the removal of the existing immediate peer is based on a relative importance of the immediate peers as determined by the evaluation module.

* * * * *

UNITED STATES PATENT AND TRADEMARK OFFICE
CERTIFICATE OF CORRECTION

PATENT NO. : 7,174,382 B2  Page 1 of 1
APPLICATION NO. : 10/119449
DATED : February 6, 2007
INVENTOR(S) : Murali Krishna Ramanathan et al.

It is certified that error appears in the above-identified patent and that said Letters Patent is hereby corrected as shown below:

In column 15, line 21, in Claim 9, delete "peer-peer" and insert -- peer-to-peer --, therefor.

In column 15, line 37, in Claim 9, delete "calculating;" and insert -- calculating: --, therefor.

In column 16, line 22, in Claim 14, after "configured" insert -- to --.

Signed and Sealed this

Twenty-sixth Day of May, 2009

JOHN DOLL
*Acting Director of the United States Patent and Trademark Office*